United States Patent
Yang (10) Patent No.: US 12,535,580 B2
(45) Date of Patent: Jan. 27, 2026

(54) TIME-OF-FLIGHT BASED DISTANCE MEASURING METHOD AND RELATED DISTANCE MEASURING SYSTEM

(71) Applicant: SHENZHEN GOODIX TECHNOLOGY CO., LTD., Guangdong (CN)

(72) Inventor: Meng-Ta Yang, Guangdong (CN)

(73) Assignee: SHENZHEN GOODIX TECHNOLOGY CO., LTD., Guangdong (CN)

( * ) Notice: Subject to any disclaimer, the term of this patent is extended or adjusted under 35 U.S.C. 154(b) by 1172 days.

(21) Appl. No.: 17/473,879

(22) Filed: Sep. 13, 2021

(65) Prior Publication Data

US 2021/0405192 A1  Dec. 30, 2021

Related U.S. Application Data

(63) Continuation of application No. PCT/CN2020/092653, filed on May 27, 2020.

(51) Int. Cl.
*G01S 17/10* (2020.01)
*G01S 7/481* (2006.01)
(Continued)

(52) U.S. Cl.
CPC ............ *G01S 17/10* (2013.01); *G01S 7/4816* (2013.01); *G01S 7/484* (2013.01); *G01S 7/4861* (2013.01);
(Continued)

(58) Field of Classification Search
CPC ...... G01S 17/26; G01S 7/4861; G01S 7/4863; G01S 17/10; G01S 7/495; G01S 17/894; G01S 17/36
See application file for complete search history.

(56) References Cited

U.S. PATENT DOCUMENTS

| 9,945,936 B2 | 4/2018 | Nevet |
| 10,021,284 B2 | 7/2018 | Wang et al. |

(Continued)

FOREIGN PATENT DOCUMENTS

| CN | 201845060 U | 5/2011 |
| CN | 103926590 A | 7/2014 |

(Continued)

OTHER PUBLICATIONS

English abstract translation of CN110208814A.
(Continued)

*Primary Examiner* — Yuqing Xiao
*Assistant Examiner* — Andrea Maria Baca
(74) *Attorney, Agent, or Firm* — WPAT, P.C.; Anthony King (57) ABSTRACT

A time-of-flight based distance measuring method and distance measuring system. The distance measuring method includes: intermittently transmitting a plurality of pulses from a pulse generation unit, wherein the plurality of pulses have a fixed pulse length but a non-fixed transmission period, and the plurality of pulses are reflected from a target to generate a plurality of reflected signals; controlling a TOF sensor to correspondingly perform a signal sampling for a predetermined time on the plurality of reflected signals respectively, based on a transmitting time of the plurality of pulses, to generate a sampling result according to a sampling time interval; detecting TOFs of the plurality of pulses from the pulse generation unit to the TOF sensor according to the sampling result; and determining a distance between the target and a reference position according to the TOFs.

15 Claims, 6 Drawing Sheets

(51) Int. Cl.
- *G01S 7/484* (2006.01)
- *G01S 7/4861* (2020.01)
- *G01S 7/4863* (2020.01)
- *G01S 7/4865* (2020.01)
- *G01S 17/26* (2020.01)

(52) U.S. Cl.
CPC .......... *G01S 7/4863* (2013.01); *G01S 7/4865* (2013.01); *G01S 17/26* (2020.01)

(56) References Cited

U.S. PATENT DOCUMENTS

| | | |
|---|---|---|
| 2004/0135992 A1 | 7/2004 | Munro |
| 2015/0241564 A1 | 8/2015 | Takano |
| 2016/0259038 A1 | 9/2016 | Retterath et al. |
| 2017/0064235 A1 | 3/2017 | Wang et al. |
| 2018/0059224 A1 | 3/2018 | Wang et al. |
| 2018/0128921 A1 | 5/2018 | Mattioli Della Rocca et al. |
| 2018/0156899 A1 | 6/2018 | Yamada et al. |
| 2019/0227169 A1 | 7/2019 | Wong |
| 2020/0408917 A1* | 12/2020 | Fereyre .................. G01S 7/484 |
| 2022/0075070 A1 | 3/2022 | Kawahito |
| 2022/0137215 A1 | 5/2022 | Ono et al. |

FOREIGN PATENT DOCUMENTS

| | | | |
|---|---|---|---|
| CN | 104181544 A | | 12/2014 |
| CN | 106908771 A | | 6/2017 |
| CN | 108885250 A | | 11/2018 |
| CN | 109313264 A | * 2/2019 | ............. G01S 13/10 |
| CN | 109613517 A | | 4/2019 |
| CN | 109696690 A | | 4/2019 |
| CN | 109765543 A | | 5/2019 |
| CN | 110221272 A | | 5/2019 |
| CN | 109870704 A | | 6/2019 |
| CN | 109901177 A | | 6/2019 |
| CN | 110208814 A | | 9/2019 |
| CN | 110297254 A | | 10/2019 |
| CN | 110632578 A | | 12/2019 |
| CN | 111123284 A | | 5/2020 |
| EP | 3232224 A1 | | 10/2017 |
| WO | 2019078366 A1 | | 4/2019 |
| WO | 2019196001 A1 | | 10/2019 |
| WO | 2020042166 A1 | | 3/2020 |

OTHER PUBLICATIONS

English abstract translation of CN110632578A.
Examination report of corresponding European patent 20923683.5.
Examination report of corresponding European patent 20922499.7.
English abstract translation of WO2020042166A1.
English abstract translation of WO2019078366A1.
Office Action of U.S. Appl. No. 17/468,101, mailed on Feb. 26, 2025.
Examination Report of EP family patent Application No. 20922499.7, mailed Mar. 12, 2025.
English abstract translation of CN110221272A.
Stoppa, David, et al. A Range Image Sensor Based on 10-um Lock-In Pixels in 0.18-um CMOS Imaging Technology. IEEE journal of solid-state circuits, 2010, 46.1: 248-258.
English Abstract of CN111398979A.
English Abstract of CN103926590A.
English Abstract of CN106908771A.
English Abstract of CN201845060U.
English Abstract of CN104181544A, CN108885250A, CN109613517A, CN109696690A, CN109765543A, CN109870704A, CN109901177A, CN110297254A, CN111123284A.
As-filed PCT Request of PCT/CN2020/092653.
As-filed PCT Application of PCT/CN2020/092653.
International Searching Authority (ISA) Form 202—Notification of Receipt of Search of PCT/CN2020/092653.
International Searching Authority (ISA) Form 210—International Search Report of PCT/CN2020/092653.
International Searching Authority (ISA) Form 220—Notification of Transmittal of the International Search Report and the Written Opinion of the International Searching Authority, or the Declaration of PCT/CN2020/092653.
International Searching Authority (ISA) Form 237—Written Opinion of PCT/CN2020/092653.
Notification of the International Application number and of the International Filing Date—Form 105 of PPCT/CN2020/092653.
English abstract translation of CN201845060U.
Office Action of U.S. Appl. No. 17/468,101, mailed on May 30, 2025.

* cited by examiner

TIME-OF-FLIGHT BASED DISTANCE MEASURING METHOD AND RELATED DISTANCE MEASURING SYSTEM

CROSS-REFERENCE TO RELATED APPLICATIONS

This application is a continuation of International Application No. PCT/CN2020/092653, filed on May 27, 2020, which claims priority to International Application No. PCT/CN2020/081061, filed on Mar. 25, 2020. All of the above-referenced applications are hereby incorporated herein by reference in their entirety.

TECHNICAL FIELD

The present application relates to distance measuring and depth sensing techniques, particularly a time-of-flight based distance measuring method and a related distance measuring system.

BACKGROUND

In the time-of-flight (TOF) based distance measuring techniques, pulse modulation measures the distance of the target by the time difference between the transmission and reception of light pulses, which is a simple measurement mechanism. Pulse modulation requires high accuracy in time measurement, and when multiple devices perform TOF based distance measurement using pulse modulation at the same time, each device may receive the reflected light signals generated from the pulses sent from other devices, thus creating cross interference, which is one of the most important issues to be solved.

SUMMARY OF THE INVENTION

One embodiment of the present application discloses a time-of-flight (TOF) based distance measuring method, including: intermittently transmitting a plurality of pulses from a pulse generation unit, wherein the plurality of pulses have a fixed pulse length but a non-fixed transmission period, and a plurality of pulses are reflected from a target to generate a plurality of reflected signals; controlling a TOF sensor to correspondingly perform a signal sampling for a predetermined time on the plurality of reflected signals respectively, based on a transmitting time of the plurality of pulses, to generate a sampling result according to a sampling time interval; detecting TOFs of the plurality of pulses from the pulse generation unit to the TOF sensor according to the sampling result; and determining a distance between the target and a reference position according to the TOFs.

Another embodiment of the present application discloses a time-of-flight (TOF) based distance measuring system, including: a pulse generation unit; a control circuit, coupled to the pulse generation unit and configured to control the pulse generation unit to intermittently transmit a plurality of pulses, wherein the plurality of pulses have a fixed pulse length but a non-fixed transmission period, and the plurality of pulses are reflected by a target to generate a plurality of reflected signals; and a TOF sensor, under the control of the control circuit and configured to correspondingly perform a signal sampling for a predetermined time on the plurality of reflected signals respectively, based on a transmitting time of the plurality of pulses, to generate a sampling result according to a sampling time interval, detect TOFs of the plurality of pulses from the pulse generation unit to the TOF sensor according to the sampling result, and determine a distance between the target and a reference position according to the TOFs.

The TOF based distance measuring method and related distance measuring system disclosed in the present application can avoid cross interference between distance measuring systems by making the transmission period of the light pulses from the same distance measuring system vary in real time.

DETAILED DESCRIPTION

The following disclosure provides many different embodiments or examples for implementing different features of the present disclosure. Specific examples of components and arrangements are described below to simplify the present disclosure. These are, of course, merely examples and are not intended to be limiting. For example, the formation of a first feature over or on a second feature in the description that follows may include embodiments in which the first and second features are formed in direct contact and may also include embodiments in which additional features may be formed between the first and second features, such that the first and second features may not be in direct contact. In addition, the present disclosure may repeat reference numerals and/or letters in the various embodiments. This repetition is for the purpose of simplicity and clarity and does not in itself dictate a relationship between the various embodiments and/or configurations discussed.

Further, spatially relative terms, such as "beneath," "below," "lower," "above," "upper," and the like, may be used herein for ease of description to discuss one element or feature's relationship to another element(s) or feature(s) as illustrated in the drawings. These spatially relative terms are intended to encompass different orientations of the device in use or operation in addition to the orientation depicted in the drawings. The apparatus may be otherwise oriented (e.g., rotated by 90 degrees or at other orientations), and the spatially relative descriptors used herein may likewise be interpreted accordingly.

Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in the respective testing measurements. Also, as used herein, the term "the same" generally means within 10%, 5%, 1%, or 0.5% of a given value or range. Alternatively, the term "the same" means within an acceptable standard error of the mean when considered by one of ordinary skill in the art. As could be appreciated, other than in the operating/working examples, or unless otherwise expressly specified, all of the numerical ranges, amounts, values, and percentages (such as those for quantities of materials, duration of times, temperatures, operating conditions, portions of amounts, and the likes) disclosed herein should be understood as modified in all instances by the term "the same." Accordingly, unless indicated to the contrary, the numerical parameters set forth in the present disclosure and attached claims are approximations that can vary as desired. At the very least, each numerical parameter should at least be construed in light of the number of reported significant digits and by applying ordinary rounding techniques. Here, ranges can be expressed herein as from one endpoint to another endpoint or between two endpoints. All ranges disclosed herein are inclusive of the endpoints, unless specified otherwise.

The TOF distance measuring scheme disclosed in the present application can be implemented by intermittently transmitting pulses from the pulse generation unit with a non-fixed transmission period and continuously performing multiple signal sampling at the TOF sensor based on the transmission time of said multiple pulses, correspondingly, to obtain the sampling results of the corresponding reflected signals (generated by the target reflecting the individual pulses), thereby realizing the sensing mechanism of pulse modulation-based analog continuous wave modulation, while avoiding cross interference with other TOF distance measuring devices. Further description is given below.

Figure 1:
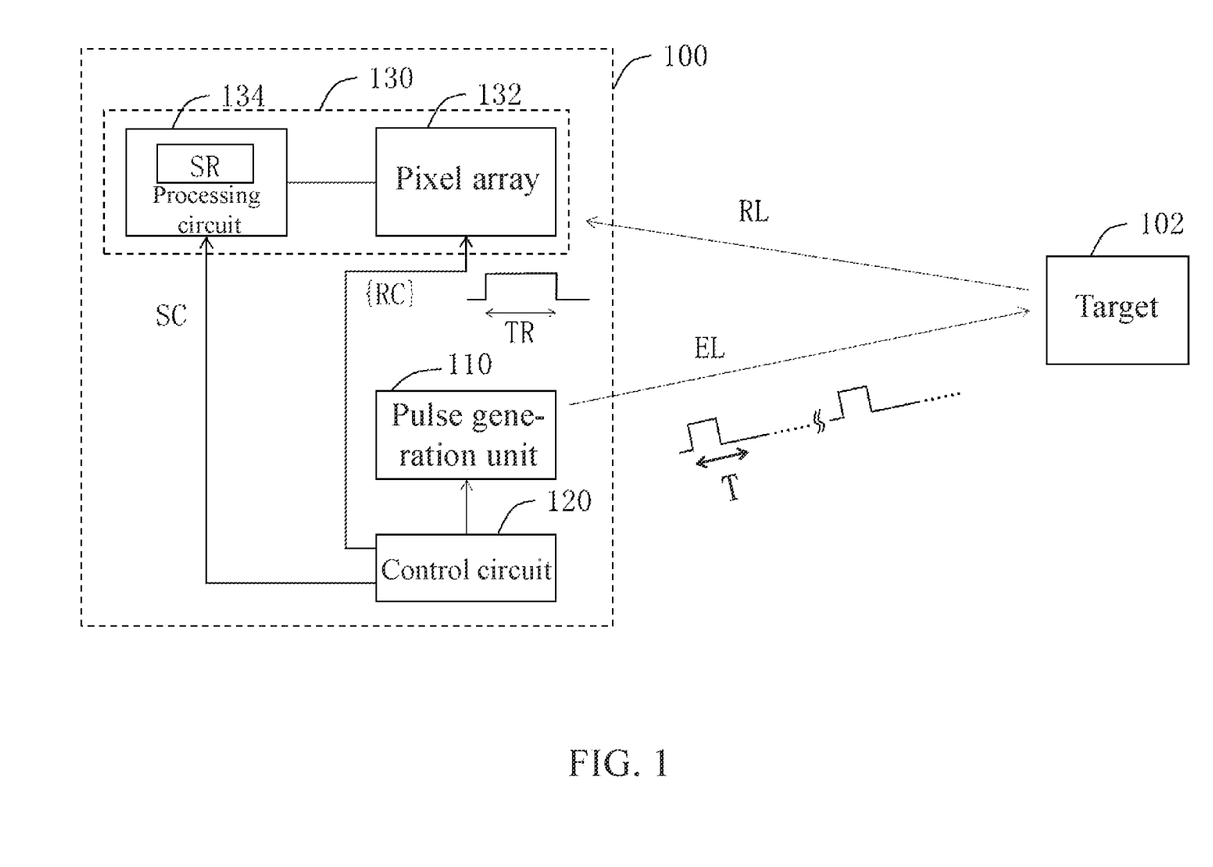
FIG. 1 is a functional block diagram illustrating a TOF based distance measuring system according to one embodiment of the present application.

FIG. 1 is a functional block diagram illustrating a TOF based distance measuring system according to one embodiment of the present application. The distance measuring system 100 is configured to detect the distance between a target 102 and the distance measuring system 100. It should be noted that the distance between the target 102 and the distance measuring system 100 should be is smaller than or equal to maximum detectable distance of the distance measuring system 100. For example (however, the present application is not limited thereto), the distance measuring system 100 can be a 3D imaging system or a depth sensing system, which can utilize the time-of-flight technique to measure the distance or depth of the surrounding target, thereby obtaining a depth of field and 3D image information.

It should be noted that, the distance measuring system 100 can be implemented as various types of TOF distance measuring systems, such as a TOF based optical distance measuring system, TOF based acoustic distance measuring system, TOF based radar distance measuring system, or other types of TOF distance measuring system. For the sake of brevity, in the following embodiments, the distance measuring system 100 is implemented as an optical distance measuring system to discuss the TOF distance measuring solution of the present application. However, persons having ordinary skill in the art should understand that the TOF distance measuring solution of the present application can be applied in any TOF based distance measuring systems.

The distance measuring system 100 can include (but is not limited to) a pulse generation unit 110, a control circuit 120, and a TOF sensor 130. The pulse generation unit 110 is configured to intermittently transmit pulses having a fixed pulse length T. After one pulse is transmitted, the pulse generation unit 110 would stop transmitting the pulse for a period of time, and this period can be much longer than or longer than the pulse length T. The pulse generation unit 110 can transmit a pulse until it is activated again. The time difference between the transmitting times of two pulses is the transmission period TS, the transmission period TS of the pulse generation unit 110 of the distance measuring system 100 is non-fixed, and the pulse length T is less than the transmission period TS.

In the present application, the distance measuring system 100 can be a TOF based optical distance measuring system, and hence, the pulse generation unit 110 can be implemented as a light pulse generation unit to generate a pulse light signal EL. For example, the pulse light signal EL can be a single light pulse that is generated intermittently. That is, the light pulse generation unit can intermittently transmit the single light pulse, which is used a single pulse intermittently generated by the pulse generation unit 110. Specifically, the light pulse generation unit transmits an individual light pulse with a variable transmission period TS. For example, the pulse generation unit 110 can include (but is not limited to) a driving circuit and a light-emitting unit (not shown in FIG. 1). The driving circuit is configured to drive the light-emitting unit, so that the light-emitting unit intermittently generate the single light pulse. The light-emitting unit can be (but is not limited to) a semiconductor laser (also referred to as a laser diode (LD)), a light-emitting diode (LED), or other light-emitting units capable of generating light pulses, wherein the light pulse generated by the semiconductor laser is coherent light, whereas the light pulse generated by the light-emitting is incoherent light.

It should be noted that, the pulse generation unit 110 can generate other types of pulses, such as, an acoustic pulse or electromagnetic pulse. For example, in the embodiment where the distance measuring system 100 is implemented as an acoustic distance measuring system, the pulse generation unit 110 can be implemented as an acoustic pulse generation device. The acoustic pulse generation device is configured to intermittently transmit the single acoustic pulse (e.g., ultrasonic acoustic pulse) as the single pulse intermittently generated by the pulse generation unit 110. In another example, in the embodiment where the distance measuring system 100 is implemented as radar distance measuring system, the pulse generation unit 110 can be implemented as an electromagnetic pulse generation device. The electromagnetic pulse generation device is configured to intermittently transmit the single electromagnetic pulse as the single pulse intermittently generated by the pulse generation unit 110.

Figure 2:
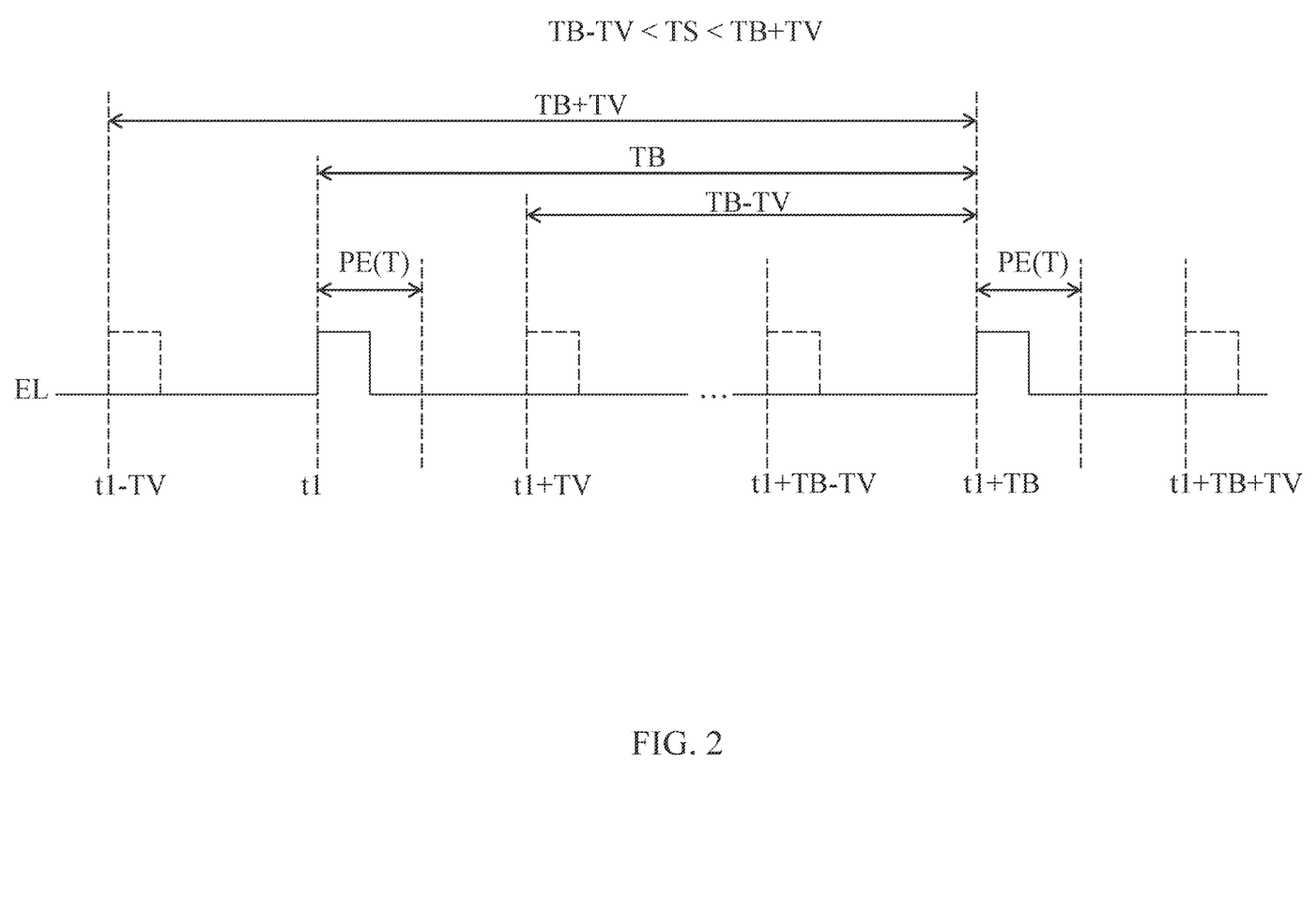
FIG. 2 is a schematic diagram illustrating the signal timing of any two adjacent light pulses transmitted by a pulse generation unit, according to embodiments of the present application.

The control circuit 120 is coupled to the pulse generation unit 110 and configured to control the pulse generation unit 110 to generate the pulse light signal EL. For example, the control circuit 120 can control the pulse generation unit 110 to intermittently transmit the light pulse. In another example, the control circuit 120 can control the driving circuit included in the pulse generation unit 110, so that the driving circuit drives the light-emitting unit included in the pulse generation unit 110 to intermittently transmit the light pulse. In the present embodiment, the control circuit 120 can change the transmission period TS of the pulse generating unit 110 in real time, but the control circuit 120 controls the average value of the transmission period TS to be a preset fixed value TB. That is to say, from a long-term perspective, the average value of the transmission period TS of a plurality of light pulses is substantially equal to the preset fixed value TB. Please also refer to FIG. 2, which is a schematic diagram illustrating the signal timing of a pulse generation unit transmitting any two light pulses according to embodiments of the present application. In FIG. 2, although only the schematic diagram of sending light pulses twice is shown, the plurality of light pulses generated by the control circuit 120 controlling the pulse generating unit 110 must comply with the rules shown in FIG. 2.

In FIG. 2, the transmission time point of the first pulse PE can fall between t1−TV to t1+TV; the transmission time point of the second pulse PE can fall between t1+TB−TV to t1+TB+TV, wherein TV is a real-time changing value. That is, the control circuit 120 controls the pulse generation unit 110 to send one light pulse PE between the time t1−TV to t1+TV and controls the pulse generation unit 110 to send another light pulse PE between the time t1+TB−TV to t1+TB+TV. Therefore, in the present embodiment, the transmission period TS of each light pulse PE is the preset fixed value TB plus the real-time changing value, wherein the real-time changing value can vary between the time length ±TV. To each light pulse PE, the preset fixed values TB are all the same, but the real-time changing values are not all the same.

Compared with the method of sending pulse signals with a fixed transmission period TB, embodiments of the present application reduce the probability of cross interference by reducing the synchronization probability of optical pulses sent by pulse generating units of different distance measuring systems, but does not change the transmission frequency of light pulses (that is, the average transmission period TS is unchanged, which is essentially equal to TB), so as not to affect the average power of the distance measuring system or to avoid the power difference between different distance measuring systems, which means that the power parameters of different distance measuring systems can be kept consistent. Compared with the method of using different frequency settings to avoid interference between different distance measuring systems, the present system design is unified and facilitates the large-scale mass production and testing of the distance measuring system, which has high industrial value. Thus, in the present embodiment, the average value of the real-time changing value is zero and is generated by the control circuit 120 in a pseudo-random manner, and therefore, the average value of the transmission period TS of the plurality of light pulses PE is the preset fixed value TB. In certain embodiments, the control circuit 120 may also generate the real-time changing value in a manner other than pseudo-random, for example, in a specific regular manner.

The real-time changing value of the present application can be N times the pulse length T, wherein N is an integer. For example, in the embodiment shown in FIG. 2, TV is 2 times the pulse length T; that is, N can be equal to 0, +2, or −2, and hence, the transmission period TS can be any of a preset fixed value TB, the preset fixed value TB plus two times the pulse length T, or the preset fixed value TB minus two times the pulse length T. If N is generated in a pseudo-random manner, the probability of all three is one-third. However, the present application is not limited thereto, in certain embodiments, N may not be an integer, and N can be generated in a regular manner.

It should be noted that if the preset fixed value TB is M times the pulse length T, then N is smaller than M. That is, the real-time changing value cannot be greater than or equal to preset fixed value TB.

The TOF sensor 130 is controlled by the control circuit 120 and configured to sample a reflected signal RL, so as to detect the distance between the distance measuring system 100 (or the TOF sensor 130) and the target 102, wherein the reflected signal RL is generated as a result of the pulse light signal EL being reflected by the target 102. In another embodiment, the control circuit 120 can be the main control unit in the terminal device and need not be included in the distance measuring system 100.

In the present application, the TOF sensor 130 continuously performs multiple times of signal sampling during an adjustable predetermined time TR (for ease of illustration, shown as the waveform having a time length labeled as TR) according to a sampling time interval, so as to generate a sampling result of the reflected signal RL.

In the present application, the TOF sensor 130 continuously performs multiple times of signal sampling during a predetermined time TR (for ease of illustration, shown as the waveform having a time length labeled as TR) based on the transmitting time of the light pulse PE according to a sampling time interval, so as to generate a sampling result of the reflected signal RL. In other words, the reflected signal RL arriving at the TOF sensor 130 during the predetermined time TR can be sensed. Generally, since the reflected signals RL reflected from a near side and a far side have different arrival times, to improve the dynamic range, it is a general practice to set the predetermined time TR as greater than or equal to the pulse length T (for example, greater than or equal to a certain fold of the pulse length T), so that both the reflected signals RL reflected from the near side and the far side will be captured.

After performing multiple times of signal sampling to generate the sampling result, the TOF sensor 130 can calculate a phase shift between the reflected signal RL and the pulse light signal EL generated by the pulse generation unit 110 according to the sampling result. For example, the TOF sensor 130 can include (but is not limited to) a pixel array 132 and a processing circuit 134. The pixel array 132 includes a plurality of pixels, each pixel can include a photo sensor to generate a photo response signal according to the reflected signal RL. The control circuit 120 can control the photo sensor of each pixel to selectively output the photo response signal corresponding to each pixel to the processing circuit 134. The photo sensor can be a photodiode.

During the predetermined time TR, the processing circuit 134 can perform one sampling to photo response signal of each pixel output every sampling time interval according to a sampling control signal SC, and generate a sampling result SR accordingly, wherein the sampling control signal SC can be generated by the control circuit 120. Next, the processing circuit 134 can perform a signal processing to the sampling result SR (said signal processing can be, such as mixed frequency processing and discrete Fourier transform), to calculate a phase shift between the reflected signal RL received by each pixel and the pulse light signal EL transmitted by the pulse generation unit 110, thereby detecting the TOF of the pulse light signal EL, and calculating the distance between the target 102 and the reference position according to TOF. The reference position can be (but is not limited to) the position of the distance measuring system 100.

Figure 3:
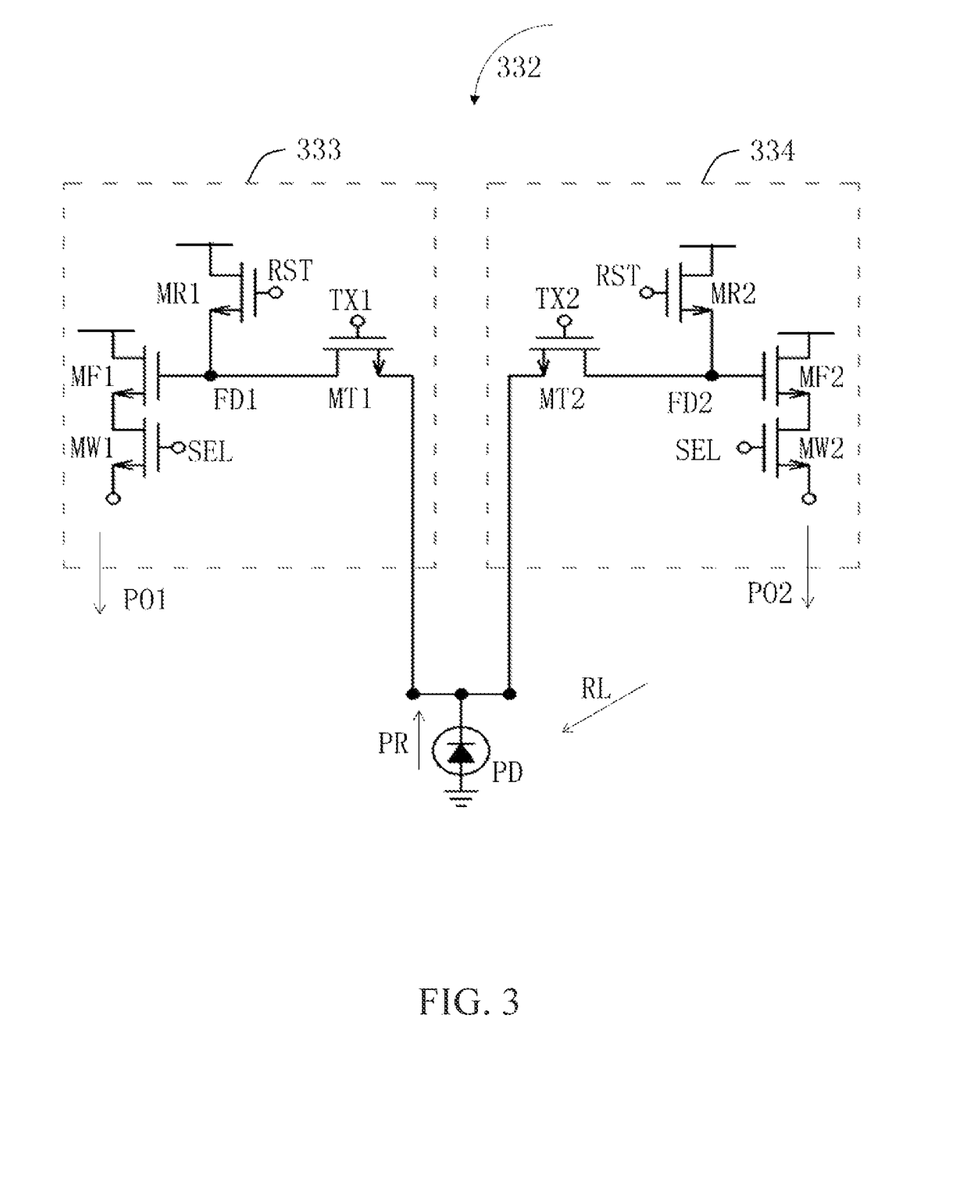
FIG. 3 is a schematic diagram illustrating one embodiment of the circuit structure of a single pixel on the pixel array of the distance measuring system shown in FIG. 1.

For ease of illustration, an embodiment of a pixel circuit is used below to illustrate the TOF distance measuring scheme disclosed in this application. However, the present application is not limited thereto. FIG. 3 is a schematic diagram illustrating the circuit structure of a single pixel in the pixel array 132 shown in FIG. 1. Please refer to both FIG. 3 and FIG. 1. In the present embodiment, the pixel 332 includes (but is not limited to) a photo sensor PD, a first readout circuit (e.g., photoelectric readout circuit) 333, and a second readout circuit (e.g., photoelectric readout circuit) 334. The photo sensor PD (e.g., photodiode) is configured to perform a light sensing operation. For example, the photo sensor PD can sense the reflected signal RL to generate a photo response signal PR correspondingly, wherein the photo response signal PR can be outputted through at least one readout circuit of the first readout circuit 333 and the second readout circuit 334. In some embodiments, the photo sensor PD can convert the received light signal into a photocurrent signal of a corresponding magnitude; i.e., the photo response signal PR may be a current signal characterizing the magnitude of the light signal, and the first readout circuit 333/second readout circuit 334 is used to read out said photocurrent signal.

The first readout circuit 333 can selectively transmit the photo response signal PR generated by the photo sensor PD according to a first control signal TX1, so as to generate a first pixel output PO1, wherein the first control signal TX1 can be provided by the control circuit 120. That is, the pixel 332 can selectively transmit the photo response signal PR through the first readout circuit to the processing circuit 130 according to the first control signal TX1, so as to generate the first pixel output PO1 and output the same to the processing circuit 130. The second readout circuit 334 can selectively transmit the photo response signal PR generated by the photo sensor PD according to a second control signal TX2, so as to generate a second pixel output PO2, wherein the second control signal TX2 can be provided by the control circuit 120 and have a phase different from the phase of the first control signal TX1; in one specific example, the phase difference between TX1 and TX2 is 180°. The pixel 332 can selectively transmit the photo response signal PR through the second readout circuit to the processing circuit 130 according to the second control signal TX2, so as to generate the second pixel output PO2 and output the same to the processing circuit 130. In the present embodiment, the first control signal TX1 and the second control signal TX2 can be provided by the control circuit 120 of FIG. 1.

In the present embodiment, the first readout circuit 333 can include (but is not limited to) a first reset transistor MR1, a first transmit transistor MT1, a first output transistor MF1 and a first readout transistor MW1. The second readout circuit 334 includes (but is not limited to) a second reset transistor MR2, a second transmit transistor MT2, a second output transistor MF2 and a second readout transistor MW2. Both the first reset transistor MR1 and the second reset transistor MR2 reset a first floating diffusion node FD1 and a second floating diffusion node FD2, respectively, according to a reset signal RST, wherein the reset signal RST can be provided by the control circuit 120. The first transmit transistor MT1 and the second transmit transistor MT2 are both coupled to the photo sensor PD, respectively, and are conducted according to the first control signal TX1 and the second control signal TX2. That is, the first transmit transistor MT1 and the second transmit transistor MT2 are respectively under the control of the first control signal TX1 and the second control signal TX2, to implement the connection and disconnection with the photo sensor PD. The first output transistor MF1 and the first output transistor MF2 are respectively configured to amplify the voltage signals of the first floating diffusion node FD1 and the second floating diffusion node FD2, so as to respectively generate a first pixel output PO1 and a second pixel output PO2. Both the first readout transistor MW1 and the second readout transistor MW2 selectively output the first pixel output PO1 and the second pixel output PO2, respectively, according to a selection signal SEL, wherein the selection signal SEL can be provided by the control circuit 120.

Figure 4:
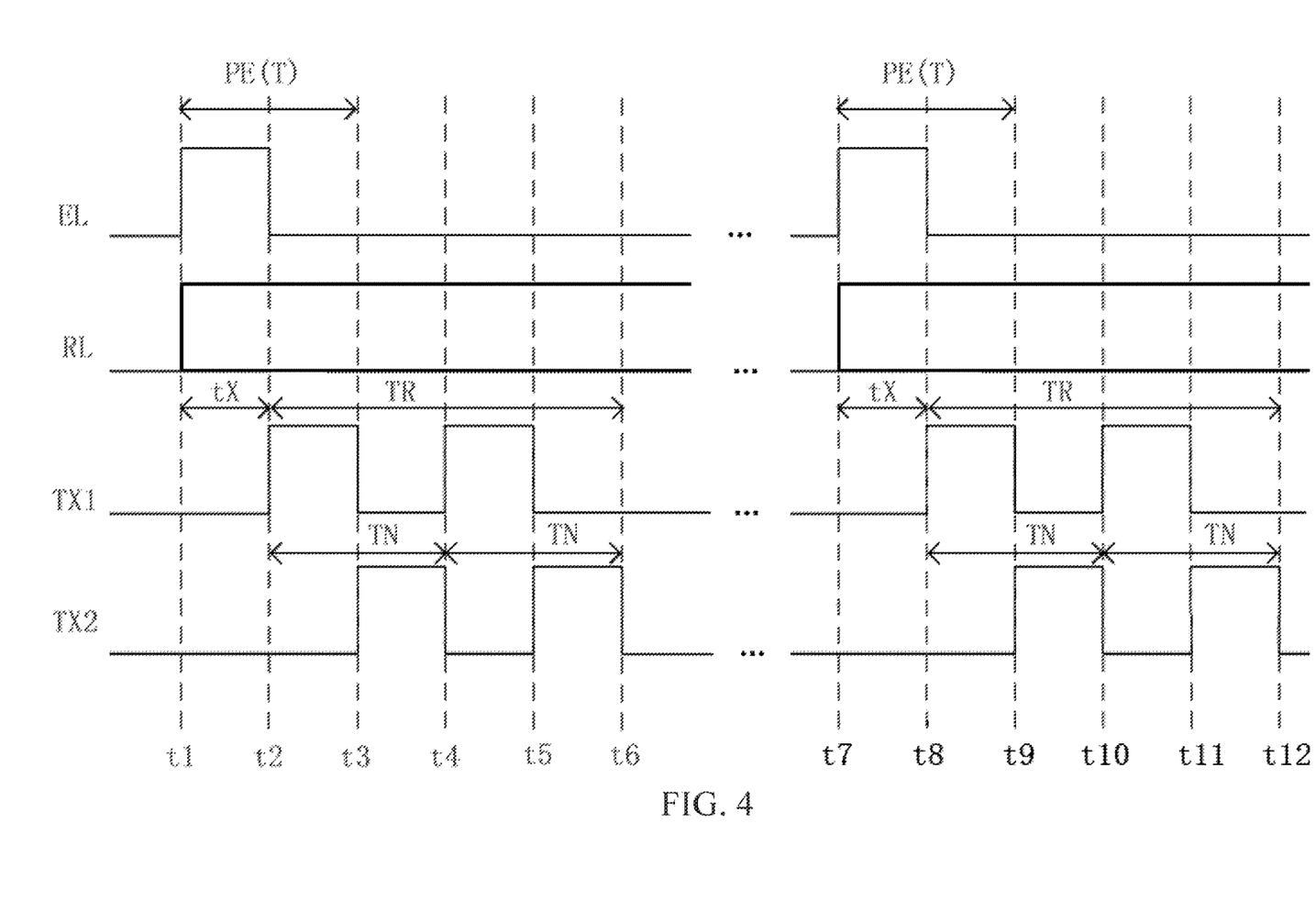
FIG. 4 is a schematic diagram illustrating the signal timing of the pixel shown in FIG. 3.

Please refer to FIG. 1, FIG. 3, and FIG. 4. FIG. 4 is a schematic diagram illustrating the signal timing of the pixel 332 shown in FIG. 3. In FIG. 4, the pulse generation unit 110 transmits a total of two pulses PE, and the sensor 130 perform two samplings accordingly, wherein the two samplings are carried out in substantially the same way.

With respect to the first pulse PE, after the first pulse PE is transmitted at the time point t1, it is reflected to become the reflected signal RL; since the reflected signal RL carries the energy reflected from the first pulse PE in different depths, the energy reflected from the near side will reach pixel 332 faster than the energy reflected from the far side. That is, it is theoretically possible that, at any time after time point t1, there is a reflected signal RL carrying the energy of the first pulse PE (see the labeling of the reflected signal RL after time point t1 in FIG. 4). The control circuit 120 controls the sensor 130 to perform signal samplings during the duration of the predetermined time TR, based on the range of distances from which the reflected energy that is desired to be captured, wherein the predetermined time TR is later by a fixed time difference tX relative to the transmission time of the first pulse PE, and since the transmission period TS is controlled by the control circuit 120, the control circuit 120 can control the start time point of the predetermined time TR correspondingly based on the transmission period TS, so that the starting time point of the predetermined time TR follows the transmitting time point of the corresponding light pulse PE, so that the time difference tX does not vary because the transmission period TS is not a fixed value.

In the present embodiment, multiple times of pulse PE (for example, thousands of times) are transmitted, and the signal sampling is performed based on the predetermined time TR, respectively. In FIG. 4, the time difference tX can be set as, for example, half of the pulse length T, but the present application is not limited thereto. The predetermined time TR can include two sampling periods TN (that is, the time point t2 to the time point t4, and the time point t8 to the time point t1 2), wherein the time length of each sampling period TN is equal to the pulse length T, but the present application is not limited thereto. In certain embodiments, the predetermined time TR can include at least one sampling period TN. The first control signal TX1 has the same waveform for each sampling period TN; the second control signal TX2 has the same waveform for each sampling period TN. There is a phase difference of 180 degrees between the second control signal TX2 and the first control signal TX1.

Further, during each sampling period TN, one sampling is performed to the output of each pixel at the sampling time interval, wherein the sampling time interval can be one-fourth of a pulse length T. However, the present application is not limited thereto, and the sampling time interval may also be one-eighth or one-sixteenth of the pulse length T.

The present application avoids cross interference between distance measuring systems by making the transmission period TS of a plurality of light pulses of the same distance measuring system 100 vary in real time, and the average value of the transmission period TS is a preset fixed value TB, so that the power of the distance measuring system 100 can be maintained, i.e., the effectiveness of the distance measuring system 100 will not change as a result. In addition, the present application does not add additional calibration procedures, and therefore does not unduly increase the complexity and cost.

Figure 5:
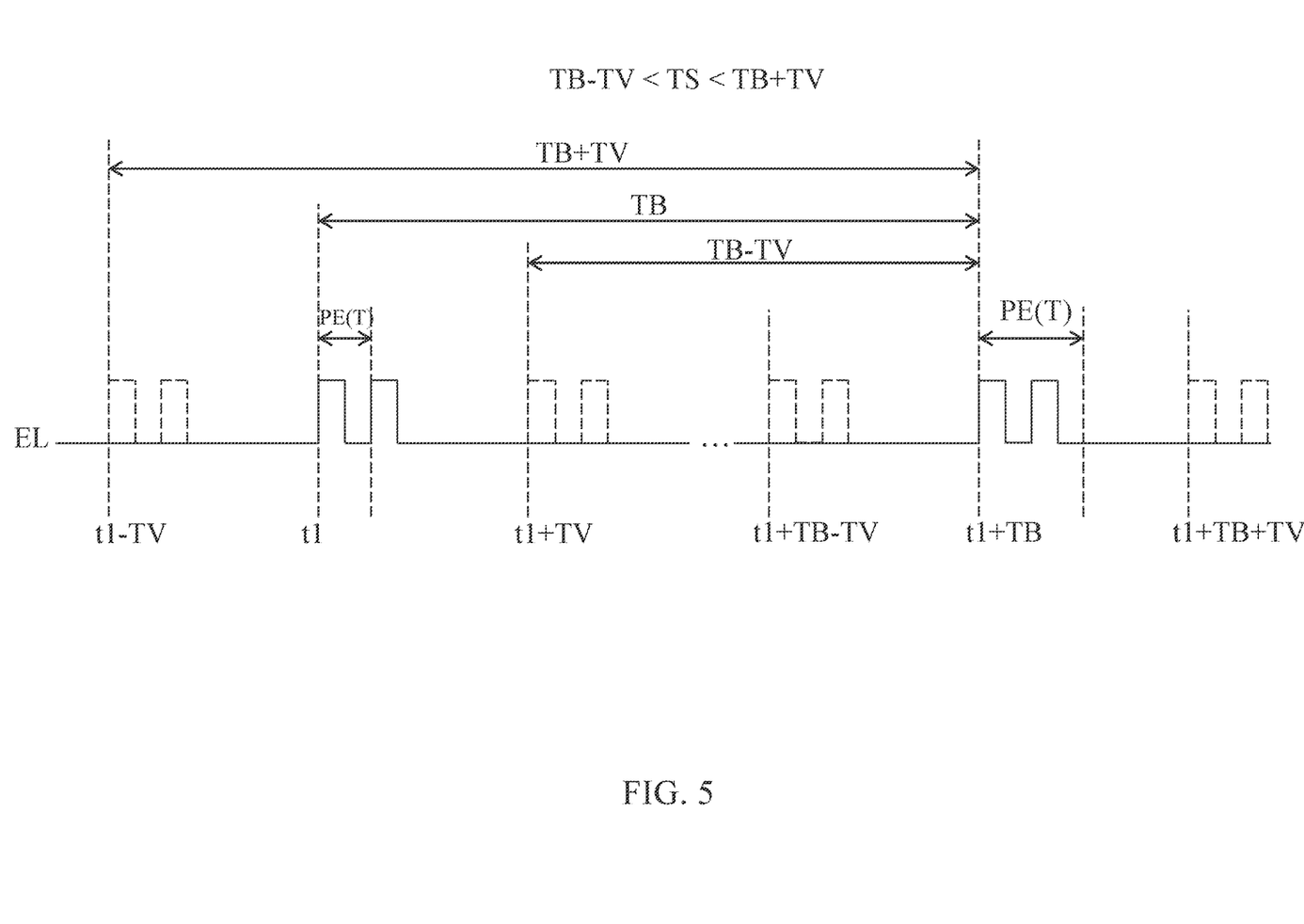
FIG. 5 is a schematic diagram illustrating the signal timing of any two adjacent light pulse sets transmitted by a pulse generation unit according to embodiments of the present application.

In certain embodiments, the pulse generation unit 110 may also intermittently generate a plurality of light pulse sets. FIG. 5 is a schematic diagram illustrating the signal timing of a pulse generation unit according to embodiments of the present application transmitting any two adjacent light pulse sets. Although FIG. 5 only schematically depicts the embodiment where two light pulse sets are transmitted, he control circuit 120 controls the plurality of light pulse sets generated by the pulse generation unit 110 in accordance with the rules shown in FIG. 5. In other words, the pulse generation unit 110 of this application can transmit a plurality of light pulse or a plurality of light pulse set with varying transmission period in real time.

Figure 6:
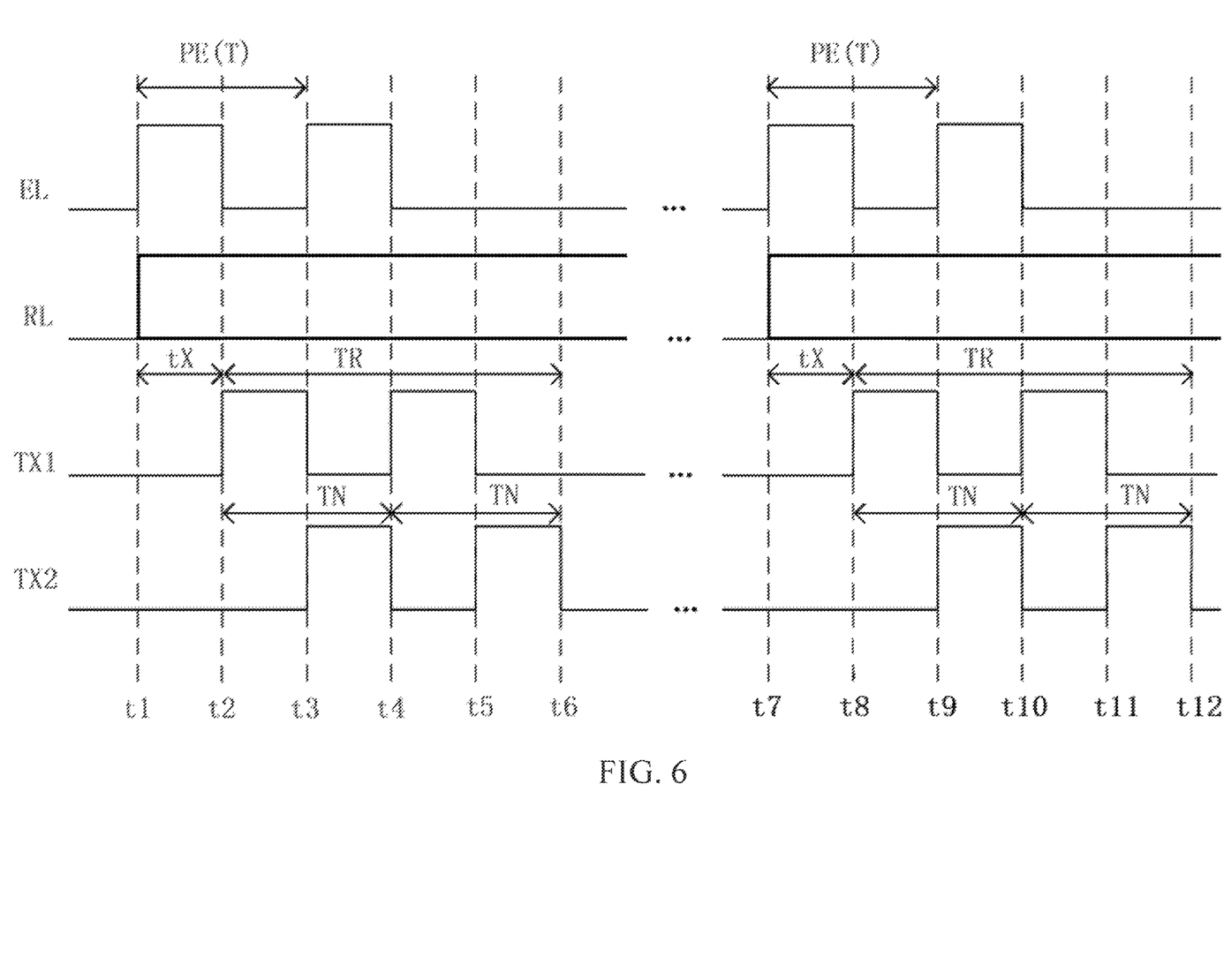
FIG. 6 is a schematic diagram illustrating the signal timing of the pixel shown in FIG. 3, according to another embodiment.

FIG. 5 is substantially the same as the embodiment of FIG. 2, the difference being that the two pulse sets in FIG. 5 each contain two pulses PE, wherein each pulse PE has a fixed pulse length T. FIG. 6 is a schematic diagram of an embodiment of the signal timing involved in the case of a plurality of light pulse sets generated intermittently by the pulse generation unit 110 of the pixel 332 shown in FIG. 3. In FIG. 6, the pulse generation unit 110 transmits a total of two pulse sets, and correspondingly, the sensor 130 performs sampling twice, in substantially the same manner as in FIG. 4.

Further, in some embodiments, each of the plurality of light pulse sets with varying transmission periods in real time sent by the pulse generation unit 110 of the present application may also have a different intensity and/or pulse length T.

The foregoing outlines features of several embodiments of the present application so that persons having ordinary skill in the art may better understand the various aspects of the present disclosure. Persons having ordinary skill in the art should appreciate that they may readily use the present disclosure as a basis for designing or modifying other processes and structures for carrying out the same purposes and/or achieving the same advantages of the embodiments introduced herein. Persons having ordinary skill in the art should also realize that such equivalent constructions do not depart from the spirit and scope of the present disclosure, and that they may make various changes, substitutions, and alternations herein without departing from the spirit and scope of the present disclosure.

What is claimed is:

1. A time-of-flight (TOF) based distance measuring method, comprising:
   intermittently transmitting a plurality of pulses from a pulse generation unit, wherein the plurality of pulses have a fixed pulse length but a non-fixed transmission period, and the plurality of pulses are reflected by a target to generate a plurality of reflected signals;
   controlling a TOF sensor to correspondingly perform a signal sampling for a predetermined time on the plurality of reflected signals respectively, based on a transmitting time of the plurality of pulses, to generate a sampling result according to a sampling time interval;
   detecting TOFs of the plurality of pulses from the pulse generation unit to the TOF sensor according to the sampling result; and
   determining a distance between the target and a reference position according to the TOFs,
   wherein an average of the transmission period of pulses in the plurality of pulses is a preset fixed value, and the transmission period of each pulse in the plurality of pulses is selected from one of the following with equal probability: the preset fixed value plus a real-time changing value, the preset fixed value, and the preset fixed value minus the real-time changing value, wherein the preset fixed values of each pulse in the plurality of pulses are all the same with each other, and the real-time changing value is N times the fixed pulse length, and N is an integer, and the integers N of the real-time changing values of each pulse in the plurality of pulses are not all the same, wherein the fixed pulse length is less than the transmission period.

2. The distance measuring method of claim 1, wherein an average of the plurality of real-time changing values of the plurality of pulses is zero.

3. The distance measuring method of claim 2, further comprising:
   generating the corresponding value of N of the plurality of pulses in a pseudo-random manner or a regular manner.

4. The distance measuring method of claim 2, wherein the preset fixed value is M times the fixed pulse length, and N is smaller than M.

5. The distance measuring method of claim 2, wherein the predetermined time includes at least one sampling period adjacent to a starting time point of the predetermined time.

6. The distance measuring method of claim 5, wherein a time length of the sampling period is equal to the fixed pulse length of the pulse.

7. The distance measuring method of claim 5, wherein the step of controlling the TOF sensor to generate the sampling result includes:
   sensing the plurality of reflected signals, respectively, to generate a response signal;
   during the sampling period, selectively receiving the response signal through a first readout circuit according to a first control signal to generate a first pixel output, and selectively receiving the response signal through a second readout circuit according to a second control signal to generate a second pixel output, wherein the second control signal and the first control signal have different phases; and
   sampling the first pixel output and the second pixel output every sampling time interval, to generate the sampling result according to the first pixel output and the second pixel output.

8. The distance measuring method of claim 7, wherein a phase difference between the first control signal and the second control signal is 180 degrees.

9. The distance measuring method of claim 7, wherein the sampling time interval is one-fourth of the fixed pulse length.

10. A time-of-flight (TOF) based distance measuring system, comprising:
    a pulse generation unit;
    a control circuit, coupled to the pulse generation unit and configured to control the pulse generation unit to intermittently transmit a plurality of pulses, wherein the plurality of pulses have a fixed pulse length but a non-fixed transmission period, and the plurality of pulses are reflected by a target to generate a plurality of reflected signals; and
    a TOF sensor, under the control of the control circuit and configured to correspondingly perform a signal sampling for a predetermined time on the plurality of reflected signals respectively, based on a transmitting time of the plurality of pulses, to generate a sampling result according to a sampling time interval, detect TOFs of the plurality of pulses from the pulse generation unit to the TOF sensor according to the sampling result, and determine a distance between the target and a reference position according to the TOFs,
    wherein the transmission period of each pulse in the plurality of pulses is selected from one of the following with equal probability: the preset fixed value plus a real-time changing value, the preset fixed value, and the preset fixed value minus the real-time changing value, wherein the preset fixed values of each pulse in the plurality of pulses are all the same with each other, and an average of the plurality of real-time changing values of the plurality of pulses is zero, the real-time changing value is N times the fixed pulse length of the pulse, and N is an integer, and the integers N of the real-time changing values of each pulse in the plurality of pulses are not all the same, wherein the fixed pulse length is less than the transmission period.

11. The distance measuring system of claim 10, wherein an average of the transmission period of each pulse in the plurality of pulses is a preset fixed value.

12. The distance measuring system of claim 11, wherein the preset fixed value is M times the fixed pulse length, and N is smaller than M.

13. The distance measuring system of claim 10, wherein the predetermined time includes at least one sampling period adjacent to a starting time point of the predetermined time, and a time length of the sampling period is equal to the fixed pulse length of the pulse.

14. The distance measuring system of claim 10, wherein the TOF sensor comprises:

a pixel array, including a plurality of pixels, wherein each pixel includes:

a photo sensor, configured to sense the plurality of reflected signals, respectively, to generate a response signal;

a first readout circuit, configured to selectively transmit the response signal according to a first control signal generated by the control circuit during the sampling period to generate a first pixel output; and     a second readout circuit, configured to selectively transmit the response signal according to a second control signal generated by the control circuit during the sampling period to generate a second pixel output, wherein the second control signal and the first control signal have different phases; and a processing circuit, coupled to the pixel array and the control circuit and configured to sample the first pixel output and the second pixel output every sampling time interval according to a sampling control signal generated by the control circuit, so as to generate the sampling result according to the first pixel output and the second pixel output.

15. The distance measuring system of claim 14, wherein a phase difference between the first control signal and the second control signal is 180 degrees, and the sampling time interval one-fourth of the pulse length.

* * * * *